H. W. Black,
Pruning Shears.

No. 105,629. Patented July 26, 1870.

Witnesses:
Gilbert B. Fowles.
N. S. Miller.

Inventor:
Henry W. Black
by his Attorney
W. Burr

United States Patent Office.

HENRY W. BLACK, OF CECILTON, MARYLAND, ASSIGNOR TO HIMSELF AND EVAN T. EVANS, OF MIDDLETOWN, DELAWARE.

Letters Patent No. 105,629, dated July 26, 1870.

IMPROVEMENT IN PRUNING-SHEARS.

The Schedule referred to in these Letters Patent and making part of the same.

*To all whom it may concern:*

Be it known that I, HENRY W. BLACK, of Cecilton, Cecil county, in the State of Maryland, have invented an Improved Pruning-Hook or Knife; and I do hereby declare that the following is a full, clear, and exact description of the construction and operation of the same, reference being had to the accompanying drawing, making a part of this specification, in which—

Figure 1:
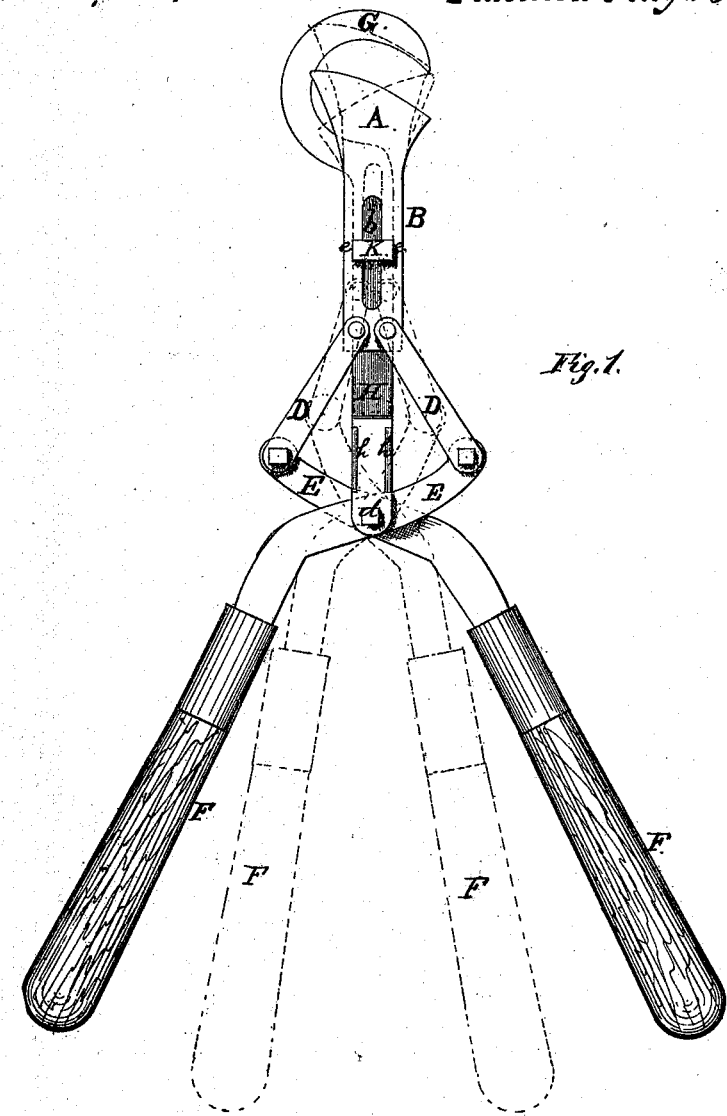
Figure 2:
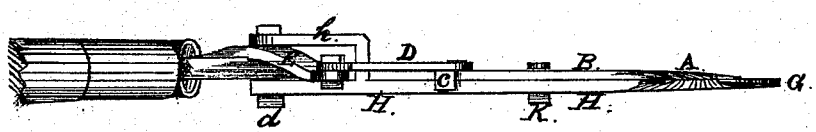

Figure 1 is a front elevation, and
Figure 2 is a side elevation.

Like letters in the two figures of the drawing indicate like parts of the invention.

Nature.

My invention consists of a double set of pivoted levers, attached to a movable cutter, so as to act in conjunction with each other in propelling the movable cutter in a straight line, in combination with a curved cutter or pruning-hook, thus greatly augmenting the cutting-power, which, by the arrangement of the levers, increases as the cutters approach the largest part of the limb, and at the point where the greatest cutting-force is required.

A is a movable cutter, provided with shank B, having an elongated slot, $b$, and guide-jaws C.

D D are two levers of equal length, one end of each being attached, by a pivot or bolt, to the movable cutter A, and the other end, by a similar bolt, to the levers E E, which are elongations of handles F F, which are shaped so as to cross each other, and are secured together by and work on the pivot-bolt $d$, as shown in fig. 1.

G is a curved knife or pruning-hook, provided with a shank, H, the lower end of which is provided with a brace-plate or jaw, $h$, and is secured to the handles by the pivot-bolt $d$, which passes through it and plate $h$, as seen in fig. 2.

K is a bolt, provided with flanges $e\ e$, and extending through slot $b$ and shank H, to which it is properly secured, as seen in both the figures of the drawing, flanges $e\ e$ extending over the shank B, forming the outside bearings and supports by which it is held in place, as seen in fig. 1.

Opening the handles draws the cutter A back and opens the cutters, ready to be placed over the limb, as shown in fig. 1, and the closing of the handles forces the cutter A up against one side of the limb, while by the same force the edge of hook G is caused to enter the other side, thus cutting the limb on both sides at once, the cutting-force increasing as the handles approach each other, and as the levers approach a straight line, and is greatly augmented by the combination of the two sets of levers acting in conjunction, instead of one lever.

The dotted lines in fig. 1 represent the position of the levers and handles when the cutters are pressed together sufficiently to entirely sever the limb, and, if preferred, the slope of the edge of cutter A may be reversed, as shown also by dotted lines in fig. 1, so that the limb, in being cut off, may be pressed back toward the bend of hook G, instead of being pressed toward the point of the hook, as will be the case when made according to the model.

What I claim is—

The double levers D D and E E, as arranged to act in conjunction, in combination with a sliding cutter, A, hook G, and shank H, substantially as described.

In attestation of the foregoing specification of my improvement in pruning-hooks I hereunto subscribe my name in the presence of subscribing witnesses, this 11th day of June, 1870.

HENRY W. BLACK.

Witnesses:
GEORGE W. MYRE,
NICHOLAS PLUMMER.